(12) United States Patent
Fuller et al.

(10) Patent No.: US 9,740,188 B2
(45) Date of Patent: Aug. 22, 2017

(54) SYSTEMS AND METHODS FOR SCHEDULING THE OPERATION OF BUILDING RESOURCES

(71) Applicants: Gary J. Fuller, New South Wales (AU); Stevun Vongtongtip, New South Wales (AU); Sharon Tickell, New South Wales (AU)

(72) Inventors: Gary J. Fuller, New South Wales (AU); Stevun Vongtongtip, New South Wales (AU); Sharon Tickell, New South Wales (AU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/951,345

(22) Filed: Nov. 24, 2015

(65) Prior Publication Data
US 2016/0077511 A1    Mar. 17, 2016

Related U.S. Application Data

(63) Continuation of application No. 12/601,226, filed as application No. PCT/AU2008/000099 on Jan. 30, 2008, now abandoned.

(30) Foreign Application Priority Data

May 21, 2007 (AU) .............................. 2007902715

(51) Int. Cl.
*G05B 19/10* (2006.01)
*G05B 15/02* (2006.01)
(Continued)

(52) U.S. Cl.
CPC ........... *G05B 19/106* (2013.01); *G05B 15/02* (2013.01); *G06F 3/04842* (2013.01);
(Continued)

(58) Field of Classification Search
CPC .............. G05B 19/106; G05B 15/02; G05B 2219/2614; G05B 2219/25339;
(Continued)

(56) References Cited

U.S. PATENT DOCUMENTS 4,840,634 A    6/1989 Muller et al.
5,124,912 A    6/1992 Hotaling et al.
(Continued)

FOREIGN PATENT DOCUMENTS

AU      2005201335    10/2005
WO   WO 2006/080975    8/2006
WO   WO 2007/013718    11/2007

OTHER PUBLICATIONS

Honeywell, "Excel Building Supervisor-Integrated R7044 and FS90 Ver. 2.0," Operator Manual, 70 pages, Apr. 1995.
(Continued)

*Primary Examiner* — Matthew Gart
*Assistant Examiner* — Stephen S Swartz
(74) *Attorney, Agent, or Firm* — Seager, Tufte & Wickhem, LLP

(57) ABSTRACT

Described herein are systems and methods for scheduling the operation of building resources. In overview, some embodiments provide a central interface for allowing the scheduling of a large number of devices within a building, irrespective of the manufacturer or scheduling requirements of the individual devices. For example, one embodiment provides, a software product that executes on a processor for allowing a user to submit scheduling preference in relation to one or more building resources. The software package analyses and applies these preferences across the devices described by the building resource or resources.

14 Claims, 6 Drawing Sheets

(51) Int. Cl.
*G06Q 10/06* (2012.01)
*G06F 3/0484* (2013.01)

(52) U.S. Cl.
CPC ......... *G06Q 10/06* (2013.01); *G06Q 10/0631* (2013.01); *G05B 2219/25339* (2013.01); *G05B 2219/2614* (2013.01); *G05B 2219/2642* (2013.01)

(58) Field of Classification Search
CPC ........ G05B 2219/2642; G06F 3/04842; G06Q 10/06; G06Q 10/0631
See application file for complete search history.

(56) References Cited

U.S. PATENT DOCUMENTS

| | | | |
|---|---|---|---|
| 5,303,369 A | 4/1994 | Borcherding et al. | |
| 5,581,703 A | 12/1996 | Baugher et al. | |
| 6,003,061 A | 12/1999 | Jones et al. | |
| 6,167,766 B1* | 1/2001 | Dunn | G01N 1/18 73/863.01 |
| 6,349,883 B1 | 2/2002 | Simmons et al. | |
| 7,039,915 B2 | 5/2006 | Kavoori et al. | |
| 7,083,109 B2 | 8/2006 | Pouchak | |
| 7,114,554 B2 | 10/2006 | Bergman et al. | |
| 7,188,219 B2 | 3/2007 | Jeddeloh | |
| 7,349,761 B1 | 3/2008 | Cruse | |
| 7,415,310 B2 | 8/2008 | Bovee | |
| 7,543,125 B2 | 6/2009 | Gokhale | |
| 7,664,823 B1 | 2/2010 | Wakerly | |
| 7,809,472 B1* | 10/2010 | Silva | F24F 3/065 165/200 |
| 7,933,265 B2 | 4/2011 | Kawamata | |
| 8,055,387 B2 | 11/2011 | McCoy et al. | |
| 8,166,484 B2 | 4/2012 | Kawato | |
| 2004/0030428 A1 | 2/2004 | Crampton et al. | |
| 2004/0131014 A1* | 7/2004 | Thompson, III | H04H 60/06 370/230 |
| 2004/0133314 A1* | 7/2004 | Ehlers | F24F 11/0012 700/276 |
| 2005/0120012 A1* | 6/2005 | Poth | F24F 11/0086 |
| 2005/0132379 A1 | 6/2005 | Sankaran et al. | |
| 2006/0200542 A1* | 9/2006 | Willig | H04L 12/10 709/223 |
| 2008/0148749 A1* | 6/2008 | Ishida | F24F 11/001 62/157 |
| 2010/0179850 A1* | 7/2010 | Fuller | G05B 15/02 705/7.12 |

OTHER PUBLICATIONS

Trane, "System Programming, Tracer Summit Version 14, BMTW-SVP01D-EN," 623 pages, 2002.

\* cited by examiner

SYSTEMS AND METHODS FOR SCHEDULING THE OPERATION OF BUILDING RESOURCES

This application is a continuation of co-pending U.S. patent application Ser. No. 12/601,226, entitled, "SYSTEMS AND METHODS FOR SCHEDULING THE OPERATION OF BUILDING RESOURCES, filed Nov. 20, 2009, now abandoned which claims priority to PCT/AU2008/000099, entitled, "SYSTEMS AND METHODS FOR SCHEDULING THE OPERATION OF BUILDING RESOURCES", filed Jan. 30, 2008, which claims priority to AU2007902715, entitled "SYSTEMS AND METHODS FOR SCHEDULING THE OPERATION OF BUILDING RESOURCES, filed May 21, 2007, all of which are incorporated herein by reference.

FIELD OF THE INVENTION

The present invention relates to systems and methods for scheduling the operation of building resources. Embodiments of the invention have been developed for providing a scalable architecture that allows the scheduling of multiple devices within a building, regardless of the manufacturer or scheduling requirements of the individual devices. While some embodiments will be described herein with particular reference to that application, it will be appreciated that the invention is not limited to such a field of use, and is applicable in broader contexts.

BACKGROUND

Any discussion of the prior art throughout the specification should in no way be considered as an admission that such prior art is widely known or forms part of common general knowledge in the field.

Buildings typically include a number of schedulable devices, including light controllers, air conditioning units, security infrastructure, elevators, and so on. These devices are, over the course of time, subject to timed control for state changes such as activation and deactivation. For example, in the interests of containing building running costs, many devices are only maintained in an active state during peak times. To provide a very simple example, the majority of lights in an office building are typically deactivated outside of expected occupancy hours.

The process of scheduling a device, in essence, involves providing scheduling information to that device. The manner by which particular devices accept scheduling information varies considerably. This is not only an issue in terms of the data format in which devices accept information, but also in terms of the nature of acceptable scheduling information. In relation to the latter, some devices are able to store only a schedule for a single 24-hour period, whilst other devices are able to store a weekly schedule, and further devices have other schedule storage capabilities (or none at all).

SUMMARY OF THE INVENTION

One embodiment provides a method for scheduling building resources, the method including the steps of:
(a) receiving data indicative of user-defined scheduling information, the user-defined scheduling information being indicative of time-specific operation preferences for one or more building resources;
(b) being responsive to the user-defined scheduling information for identifying a set of one or more target devices related to the building resource or resources;
(c) for each identified target device, obtaining a device-specific scheduling protocol from a repository of device-specific scheduling protocols;
(d) providing device-specific scheduling information to each of the target devices in accordance with the target devices' respective device-specific scheduling protocols thereby to apply the time-specific operation preferences.

One embodiment provides a method for scheduling building resources, the method including the steps of:
(a) on the basis of user-defined scheduling information, defining time-specific operation settings for one or more building resources;
(b) being responsive to the user-defined scheduling information for identifying a first set of target devices related to the building resource or resources;
(c) for each identified target device, obtaining a device-specific scheduling protocol from a repository of device-specific scheduling protocols;
(d) providing device-specific scheduling information to each of the target devices in accordance with the target devices' respective device-specific scheduling protocols thereby to apply the time-specific operation settings.

One embodiment provides a system for scheduling building resources, the system including:
an interface for receiving data indicative of user-defined scheduling information, the user-defined scheduling information being indicative of time-specific operation preferences for one or more building resources;
a first processor that is responsive to the user-defined scheduling information for identifying a first set of target devices related to the building resource or resources;
a second processor for, for each identified target device, obtaining a device-specific scheduling protocol from a repository of device-specific scheduling protocols;
an output for providing device-specific scheduling information to each of the target devices in accordance with the target devices' respective device-specific scheduling protocols thereby to apply the time-specific operation preferences.

One embodiment provides a method for scheduling building resources, the method including the steps of:
receiving data indicative of user-defined scheduling information, the user-defined scheduling information being indicative of time-specific operation preferences for one or more building resources;
identifying a set of target devices affected by the scheduling information;
on the basis of operation rules, defining operation settings corresponding to the operation preferences;
monitoring scheduling information loaded on each of the target devices to identify inconsistencies between the loaded scheduling information and the operation settings; and
being responsive to an inconsistency relating to a given target device for providing to that device consistent scheduling information, wherein the scheduling information is provided in accordance with a device-specific scheduling protocol for that device.

One embodiment provides a system for scheduling building resources, the system including:
an interface for receiving data indicative of user-defined scheduling information, the user-defined scheduling information being indicative of time-specific operation preferences for one or more building resources;

a first processor for identifying a set of target devices affected by the scheduling information;

a second processor for on the basis of operation rules, defining operation settings corresponding to the operation preferences;

a third processor for monitoring scheduling information loaded on each of the target devices to identify inconsistencies between the loaded scheduling information and the operation settings;

a fourth processor that is responsive to an inconsistency relating to a given target device for defining an instruction to provide to that device consistent scheduling information, wherein the scheduling information is to be provided in accordance with a device-specific scheduling protocol for that device; and an output for providing the consistent scheduling information to the relevant device.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Preferred embodiments of the invention will now be described, by way of example only, with reference to the accompanying drawings in which.

DETAILED DESCRIPTION

Figure 1:
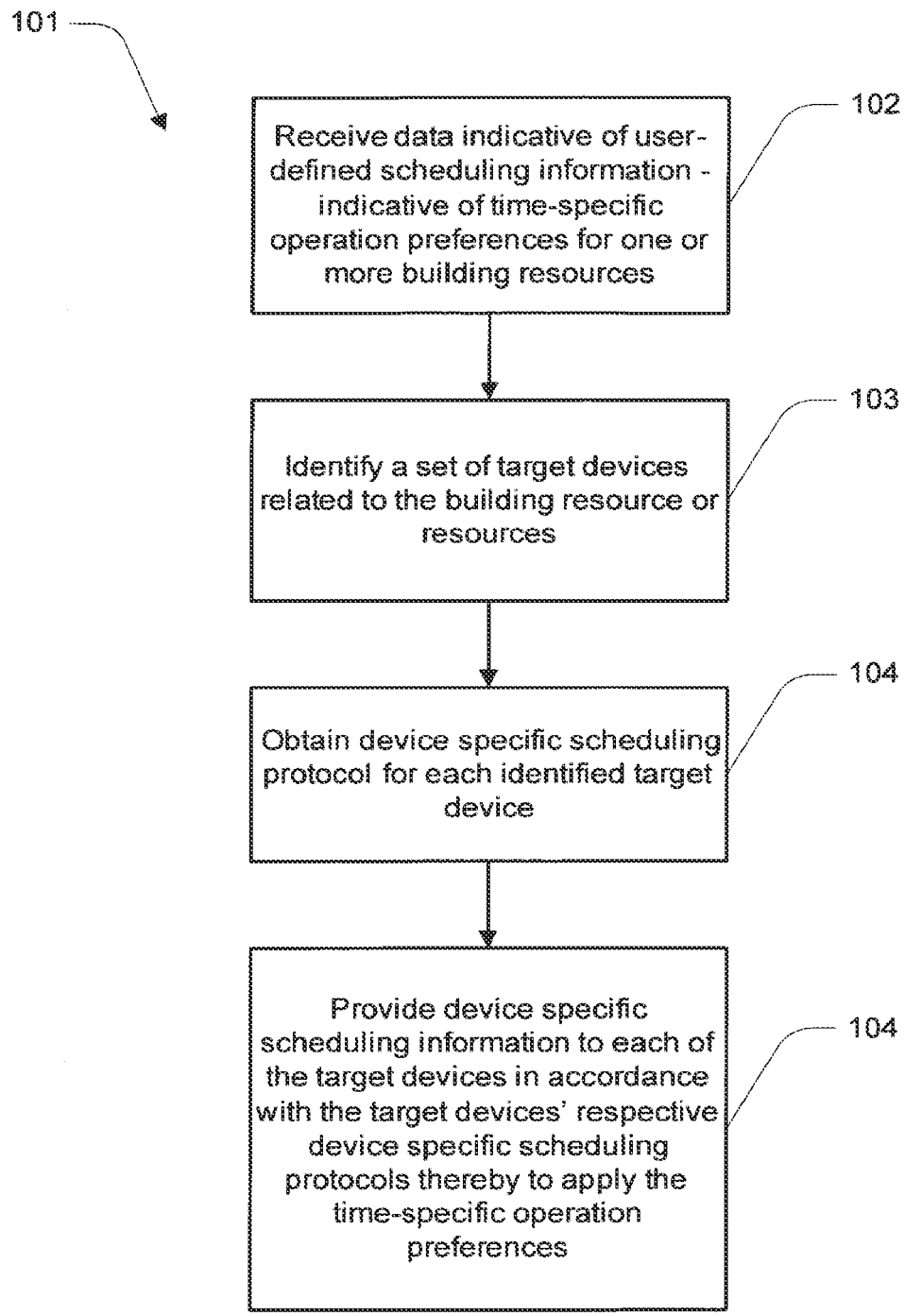
FIG. 1 is a schematic representation of a method according to one embodiment.

Described herein are systems and methods for scheduling the operation of building resources. In overview, some embodiments provide a central interface for allowing the scheduling of a large number of devices within a building, irrespective of the manufacturer or scheduling requirements of the individual devices. For example, one embodiment provides a software package that executes on a personal computer for allowing a user to submit scheduling preferences in relation to one or more building resources. The software package analyses and applies these preferences across target devices described by the building resource or resources.

In overview, some embodiments provide a user interface for allowing a user to enter scheduling information at a high level of abstraction, for example by adding events and/or modifying events in a calendar. In some embodiments this is performed much in the same way as meetings and the like are scheduled in known diary management programs, such as the "Calendar" functionality in MS Outlook. This data is entered "at a high level of abstraction" in the sense that the user need not be concerned with nuances of how individual devices are scheduled, how devices interoperate, run-in times, and so on. These issues are dealt with as a back-end functionality. For example, one embodiment provides an information system allows a user to provide user-defined scheduling information that is indicative of time-specific operation preferences for one or more building resources. The term "building resource" is used to describe a single target device or a plurality of target devices. The information system is responsive to the provision of such user-defined scheduling information for:

Identifying the target device or target devices affected by the user-defined scheduling information.

On the basis of operation rules, processing the user defined scheduling information for defining operation settings. In overview, the user defined scheduling information is indicative of time-specific operation preferences. These preferences are defined at a relatively high level of abstraction. The operation settings, on the other hand, are defined such that practical considerations such as run-in times and interoperability are addressed. The operation settings define, for each device, one or more scheduled changes in operational state. For example, the preferences might indicate that an HVAC unit is required from 10 AM on a given day. For the sake of example, assume that the HVAC unit in question must be activated 1 hour before it becomes functionally operational. In that example, the settings are defined such that the HVAC unit is activated at 9 AM. Operation settings are stored in a server-side repository.

Monitoring scheduling information loaded on each target device to identify inconsistencies between the loaded scheduling information and the server-side operation settings.

Where an inconsistency is observed between loaded scheduling information and the server-side operation settings for a given device, providing to that device, in accordance with a device-specific scheduling protocol for that device, data to resolve the inconsistency. In this manner, each device is periodically checked and updated such that the server-side operation settings match device-side scheduling information.

Various Embodiments are Discussed Below

FIG. 1 illustrates a method 101 according to one embodiment. Step 102 includes receiving data indicative of user-defined scheduling information. This user-defined scheduling information is indicative of time-specific operation preferences for one or more building resources, such as, in broad terms, lighting, security infrastructure, air conditioning, and so on. Step 103 includes being responsive to the user-defined scheduling information for identifying a set of target devices related to the building resource or resources. For example, step 103 includes identifying the set of devices affected by the user-defined scheduling information. Step 104 includes, for each identified target device, obtaining a device-specific scheduling protocol from a repository of device-specific scheduling protocols. Step 105 includes providing device-specific scheduling information to each of the target devices in accordance with the target devices' respective device-specific scheduling protocols thereby to apply the time-specific operation preferences.

In relation to step 102, the manner in which data indicative of user-defined scheduling information is received varies between embodiments. For example, in some embodiments described below, the user-defined scheduling information is defined by a user by way of a scheduling interface provided by software executing on one or more processors of a personal computer or other computational platform.

The term "user-defined scheduling information" should be read broadly to include information that originates in whole or in part from a human user, and relates to "scheduling" in a broad sense. That is, the information includes aspects relating to times and events associated with those times. As used herein, the term "user-defined scheduling information" describes the sort of information that is defined in whole or in part by a user.

As foreshadowed, user-defined scheduling information is indicative of "time-specific operation preferences". These preferences identify times and corresponding operational state information for one or more building resources, based on the preferences is the user. For example, the user-defined scheduling information might identify that building resource A should adopt state B between time C and time D.

The term "building resource" is used to describe one or more target devices. In some cases the target devices described by a building resource are similar—for example where a building resource describes all lighting control units on a particular floor of a building. In some cases a building resource describes a variety of different target devices—for example where a building resource describes security cameras and associated recording and/or storage devices. In some cases a building resource identifies a single target device, such as a particular piece of machinery. In some cases, a building resource identifies a single physical device that, in itself, includes a plurality of target devices. In some cases, a first individual physical device includes a first plurality of target devices, a second individual physical device includes a second plurality of target devices, and a building resource identifies one or more target devices of the first plurality and one or more target devices of the second plurality. In some embodiments, a user is provided with an opportunity to define a building resource on the basis of one or more target devices, and/or one or more predefined building resources.

There is no inherent limitation that a building resource describes target devices located in a common physical building—in some embodiments a building resource describes target devices distributed across a plurality of distributed buildings.

In the context of step 103, the set of target devices related to the building resource or resources essentially includes those target devices described by the building resource or resources. That is, where the scheduling information is indicative of time-specific operation preferences for a single building resource, the set of target devices related to the building resource includes those target devices described by that building resource. Where the scheduling information is indicative of time-specific operation preferences for two or more building resources, the set of target devices related to the building resources includes the target devices described by those building resources in combination. In some instances, the set includes only a single target device, and as such the use of the term "set" should not imply any requirement that there be more than one building resources in the set. In some cases a target device controls one or more additional devices. One exemplary target device is a lighting controller that controls the operation of a plurality of individual lights.

The term "target device" should also be read broadly to essentially describe any item or physical device, or component of any item or physical device, in a building that is capable of adopting two or more operational states, such as "activated" and "deactivated". That is, in some cases a physical device includes a plurality of target devices. To provide a practical example, a television might be considered to include several target devices, including a target device that effects whether or not the television is operational, a target device that affects volume settings for the television, and a target device that affects the channel displayed on the television. In the present context, a target device is also capable of receiving scheduling information. For a given device, the scheduling information must be received in accordance with a device-specific scheduling protocol for that device. Examples of target devices include lighting controllers, elevators, security doors or security door controllers, surveillance cameras and associated monitoring equipment (such as camera servers), air conditioning units, HEPA filtration units, industrial equipment in a broad sense, automatic doors, and so on.

The term "scheduling information" generally describes data indicative of one or more changes in operational state, and an associated time for adopting each change respectively. In a simple example, scheduling information is indicative of an instruction to adopt a particular state immediately—such as an instruction to activate immediately. However, in most cases scheduling information is indicative of a plurality of state changes and a respective plurality of times—such as an instruction to activate at 10 AM, deactivate at 12 PM, then activate again at 2 PM, and deactivate at 4 PM. In some cases the operational states are more complicated than simply active and inactive states. For example, an air conditioning unit may have defined for it several active states, each relating to a different temperature setting and/or mode of operation (heat/cool, etc).

As foreshadowed, step 104 includes, for each identified target device, obtaining a device-specific scheduling protocol from a repository of device-specific scheduling protocols. A "device-specific scheduling protocol" is a collection of information that identifies the manner in which a device accepts scheduling information. This has two main aspects:

A communications protocol. This essentially defines a "language" for the device—scheduling information must be provided in this "language" for it to be appropriately recognized and implemented by the device. In some embodiments the communications protocol is also indicative of a communications means—it identifies the physical communications channel by which data should be provided to the device in question. Various communication channels are used by different devices, such a serial communication (for example over a specific serial connection), network communication (for example over a TCP/IP network), various wireless communications mechanisms (such as GSM or CDMA networks), radio frequency channels, and so on. It will be appreciated that the communications protocol relates to the data format in which a device accepts information.

A schedule storage protocol. This essentially defines the manner in which scheduling information is able to be stored by the target device, if at all. In some embodiments, the schedule storage protocol indicates whether a device is able to accept scheduling information for a 24-hour period, weekly period, fortnightly period, monthly period, or some other period. Some target devices accept scheduling information only to the extent that they are controllable. For example, some devices are incapable of storing data regarding an upcoming scheduled change in operational state, and are only able to accept an instruction to effect a change in operational state at the time when that change is to be affected. It will be appreciated that the schedule storage protocol relates to the nature of acceptable scheduling information for a device.

In embodiments considered herein, the device-specific scheduling protocol for a given device provides sufficient information about that device to allow scheduling information appropriate for the device in question to be defined in light of the above aspects.

In some cases, more than one target devices in the set share a common scheduling protocol—for example where those devices are of a common make and/or model.

The nature of repository from which the device-specific scheduling protocols are obtained varies between embodiments. For example, in some embodiments the repository is provided by a single database and/or server, or a collection of coupled databases and/or servers. In other embodiments the repository is provided by a plurality of distributed databases and/or servers. For example, in one embodiment the protocol is obtained from a remote server via the Internet. In some embodiments method 101 is performed on the basis of software instructions executable on a processor, and the repository is provided by a memory module or storage device coupled to that processor.

The manner by which device-specific scheduling protocols are maintained in the repository also varies between embodiments. Preferably, the repository is configured such that additional scheduling protocols are able to be added over time, thereby to provide a scalable architecture that is capable of being expanded to operate with new forms of target device by adding scheduling protocols for those devices. That is, some embodiments include a framework for the addition of a further one or more device-specific scheduling protocols. In one embodiment, the repository is a database or table having entries corresponding to each scheduling protocol, thereby to allow a module responsible for the delivery of scheduling information to identify an appropriate protocol for a device under consideration. In another embodiment, rather than entries in a database or table, individual protocol files are maintained.

The term "obtaining" in the context of "obtaining a device-specific scheduling protocol" need not infer a requirement that the whole protocol be physically obtained. For example, in some embodiments obtaining includes accessing data indicative of the protocol stored at a remote location so that relevant information from the protocol can be accessed and analyzed.

In the context of step 105, the term "providing" should be read broadly to include directly providing the device-specific scheduling information to each of the target devices, and to include providing an intermediary signal on the basis of which the device-specific scheduling information is provided to each of the target devices. An example of the latter is a signal that provides data indicative of the scheduling information to an RF transmitter, along with an instruction for that transmitter to provide the scheduling information to each relevant device.

As foreshadowed, device-specific scheduling information is provided to each of the target devices in accordance with the target devices' respective device-specific scheduling protocols. That is, each device has provided to it its own device-specific scheduling information, and this information is provided in an appropriate manner given the communications protocol and schedule storage protocol for that device.

The precise manner in which the device-specific scheduling information is provided to each of the target devices varies between embodiments. For example, in some embodiments a download component is associated with one or more of the devices, that component being responsible for providing scheduling information to its associated device or devices. These download components operate in parallel so that multiple target devices are simultaneously provided with their respective device-specific scheduling information.

In the case that two or more like devices are to be scheduled in the same manner, the device-specific scheduling information provided to those devices is the same. For example, consider a situation where a building resource called "level 5 lighting" is to be scheduled. For the sake of example, level 5 lighting describes four like target devices, being lighting controllers that each control a set of fluorescent lights on level 5 of a building. The scheduling information provided to each of these devices is generally the same. Where this scheduling information is carried to each device by a respective signal, those signals need not be the same. For example, in some embodiments the signals include addressing information as well as scheduling information.

The notion of "applying the time-specific operation preferences" should be considered in a broad manner. In some embodiments, the application includes a direct application—the user-defined preferences indicate that a device A be should activated at time B, and device A is provided with scheduling information so that it is activated at time B. However, in other embodiments the application includes an interpreted application—the user-defined preferences indicate that a device A should be activated at time B, and device A is provided with scheduling information so that it is activated at time C, which is an interpretation of time B. This is, in some embodiments, due to a "sanity check" whereby the scheduling preferences are assessed in light of a set of operation rules to determine whether they are practically acceptable. In one such embodiment, method 101 includes being responsive to the time-specific operation preferences for defining time-specific operation settings corresponding to the time-specific operation preferences, and step 105 includes applying the time-specific operation settings.

Figure 1A:
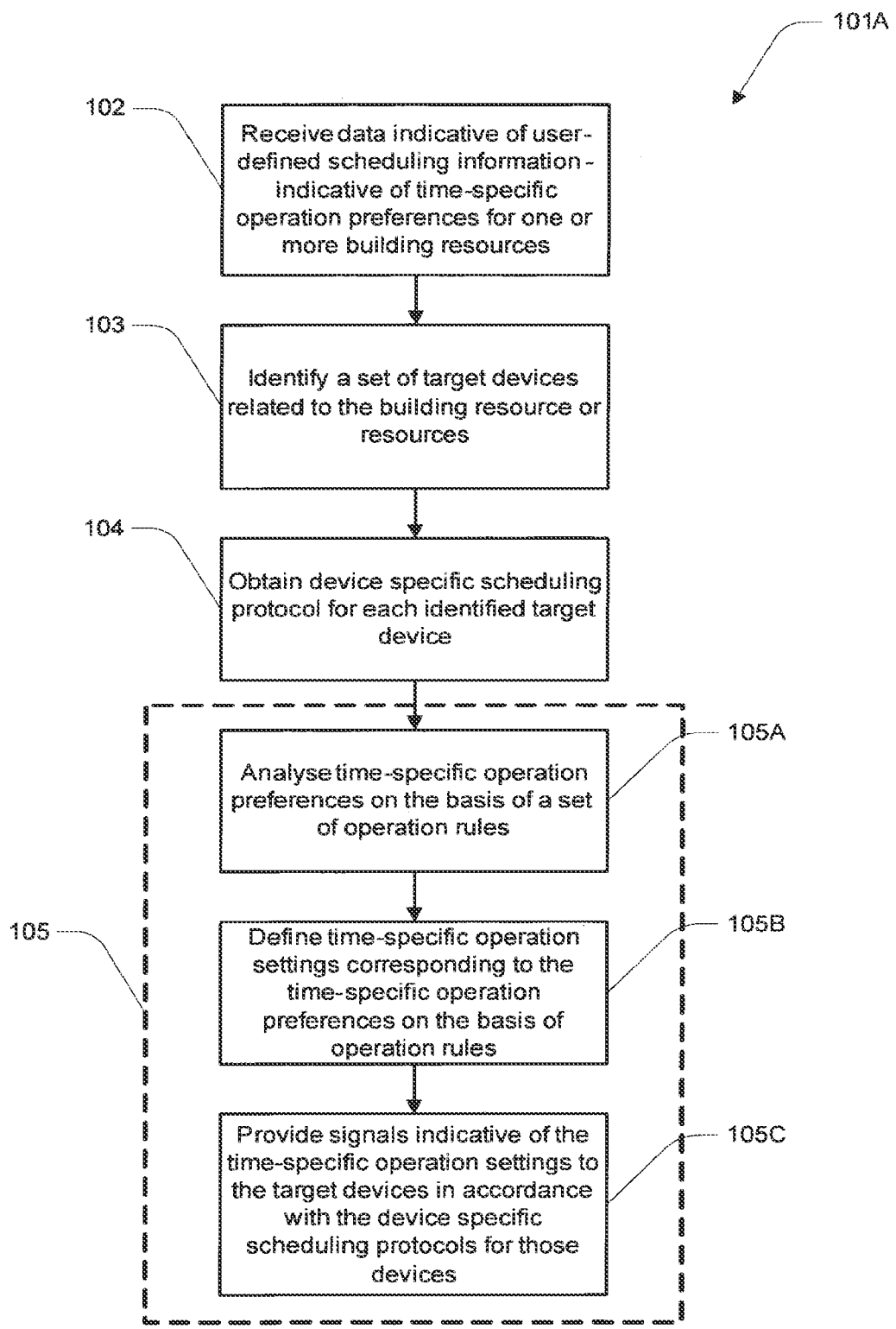
FIG. 1A is a schematic representation of a method according to one embodiment.

FIG. 1A illustrates a variant of method 101, in the form of method 101A, in which applying operation preferences includes defining and applying time-specific operation settings. In the context of method 101A, step 105 includes sub-steps 105A, 105B and 105C. Sub-step 105A includes analyzing the time-specific operation preferences on the basis of a set of operation rules. Sub-step 105B includes defining time-specific operation settings corresponding to the time-specific operation preferences on the basis of the operation rules. Sub-step 105C includes providing signals indicative of the time-specific operation settings to the target devices in accordance with the device-specific scheduling protocols for those devices.

The time-specific operation rules identify practically acceptable state change times for each device in the first set of target devices. For example:

The operation rules include a requirement that a first target device adopt a first state whenever a second target device adopts a second state. For example, where two devices should be active at the same time.

The operation rules include a requirement that a first target device adopt a first state at prior to a second target device adopting a second state. For example, where one device needs to be activated prior to another device.

Some practical examples of how these operation rules apply in practical situations are discussed further below.

In some embodiments, whereas operation preferences are, for each resource, indicative of one or more times and associated changes in operational state for that resource in general terms, operation settings are, for each device, specifically indicative of one or more times and associated changes in operational state for that resource (and its constituent devices). A rationale for this approach is, for example, to accommodate for devices within a resource that should ideally be activated in a given order, or to accommodate for devices that have a run-in time. In relation to the former, it is often preferable to switch on a large number of lights in a sequential manner rather than simultaneously, for example to reduce the risk of power spikes. The operation preferences identify a time at which all of the lights in a building (the resource) should be switched on, and the operation settings identify a staggered set of times for each of the relevant light controllers (the target objects) should change to an active state. In relation to the latter, consider the example of a piece of equipment that has a ½ hour run-in time. The operation preferences identify a time from which the piece of equipment should be active, and the operation settings identify time ½ an hour earlier for the piece of equipment to be activities.

By separating the notions of operation preferences and operation settings, it is possible to accept scheduling information from a user at a high level of abstraction, without the user necessarily knowing various nuances (or having to worry about such nuances) that affect how devices operate and interrelate. These nuances are dealt with as a back-end issue by reference to the operation rules, and the physical scheduling is implemented in a manner that is not only in conformity with the user's desires, but also acceptable in light of practical considerations.

In some cases, the schedule storage protocol for a given target device provides a significant limitation on the amount of scheduling information that can be provided to a given target device. For example, some devices are only able to store scheduling information for a single 24-hour period. Such a device, once provided with scheduling information, repeats the same schedule every 24 hours. However, time-specific operations settings need not recur on a 24-hour basis—in some cases they are for one-off events, in some cases they schedule events on a weekday-only basis on a 7-day calendar, and so on. Some embodiments take additional steps to isolate a user from such limitations, as discussed below.

In some embodiments, the approach for isolating a user from device scheduling limitations includes maintaining at a server-side location current data indicative of scheduling information stored on each target device. For each device, this is referred to as the "loaded scheduling information". This loaded scheduling information is compared with a server-side repository of data indicative of the time-specific operation settings to determine whether a given device is loaded with appropriate scheduling information for one or more upcoming state changes.

In some embodiments the loaded scheduling information is periodically analyzed to determine whether the loaded scheduling information is consistent with the device-specific operation settings. In the event that an inconsistency is identified, it is rectified by providing appropriate consistent scheduling information to the relevant device or devices. This analysis is performed by reference to the device-specific operation protocols, particularly by reference to the schedule storage protocol. For example, in the case of a device that accepts scheduling information for a single 24-hour period only, the analysis looks for inconsistencies over a 24-hour period from the time of analysis. In the case of a device that accepts scheduling information for a single 7-day period, the analysis looks for inconsistencies over a 7-day period from the time of analysis To provide a practical example of an inconsistency and how it is rectified, consider operation settings that apply to a recurring one-week period. Assume the operation settings identify that a target device, Device X, should be active from 9 AM to 5 PM from Monday to Friday only, and inactive at other times. Further assume that Device X is only able to store scheduling information for a single 24-hour period. For the sake of example, assume that the operation preferences are to be applied as of 7 AM on a Monday. That is, Device X has no scheduling information loaded at 7 AM on Monday. Analysis occurs every minute, with the first analysis occurring at 7 AM Monday, looking for inconsistencies in a 24-hour period from 7 AM Monday to 7 AM Tuesday (substantially). An inconsistency is found, specifically that the loaded scheduling information indicates no state changes, but the operation settings identify state changes at 9 AM and 5 PM. The relevant scheduling information for these state changes is provided to Device X. It will be appreciated that further inconsistencies are identified in the first next analysis after 9 AM on Friday, the first analysis after 5 PM on Friday, the first analysis after 9 AM on Sunday, the first analysis after 5 PM on Sunday, and so on.

In various embodiments, the periodic analysis occurs multiple times in a minute, once a minute, once an hour, one or more times daily, or upon predefined criteria being satisfied.

Other embodiments implement alternate approaches for dealing with inconsistencies between the operation settings and loaded scheduling information. For example, some approaches analyze only the next change in state for any given device.

The general approach of continuously monitoring and rectifying inconsistencies between the operation settings and loaded scheduling information provides significant advantages beyond simply allowing scheduling of devices having differing acceptable forms for scheduling information. In particular, there are significant advantages in dealing with irregular events, such a public holidays, one-off events, and so on. Such events are conveniently scheduled at a high level of abstraction, however the low level programming of devices traditionally requires significant manual intervention. Often, the cost of such manual intervention outweighs the cost and energy savings associated with, for example, scheduling building resources on a weekend-type manner for public holidays.

Figure 2:
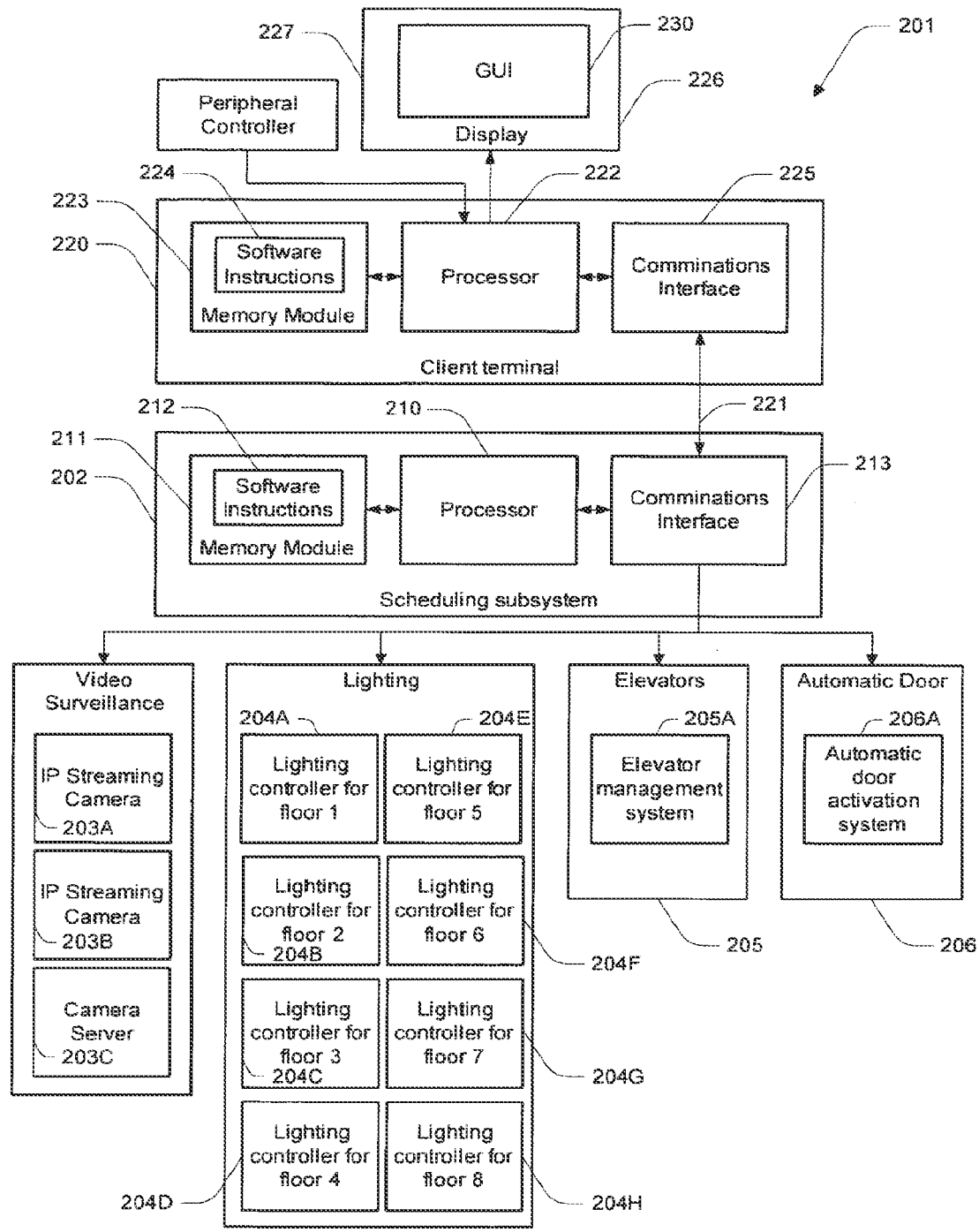
FIG. 2 is a schematic representation of a system according to one embodiment.

FIG. 2 illustrates a system 201 according to an embodiment. System 201 includes a scheduling subsystem 202 for allowing the scheduling of a plurality of building resources, this example illustrating resources 203 to 206. These resources are located in a common building 208.

Resources 203 to 206 are considered for the sake of illustration only, and in practice subsystem 202 is configured for allowing scheduling of various other resources. In the present example, the illustrated building resources each describe a respective one or more target devices, as follows:

Resource 202 describes a first IP streaming surveillance camera 203A, a second IP streaming surveillance camera 203B, and a camera server 203C coupled to cameras 203A and 203B for managing the operation and control of those cameras. Resource 203 has two operational states: active and inactive. The active state defines a configuration where the cameras and camera server are operational, and adopt certain default parameters. The inactive state defines a configuration where the cameras and camera server are inactive.

Resource 203 describes eight six individual light controllers 204A to 204H. Each of these light controllers controls fluorescent office lighting on a respective floor of building 208. Resource 204 has two operational states: active and inactive. The active state defines a configuration where the lights are all switched on, whilst the inactive state defines a configuration where the lights are all switched off.

Resource 205 describes an elevator management system 205A, which includes a set of elevators, access control system, and elevator calling/coordination facilities. Resource 205 has three operational states: peak, off-peak and locked. The peak state defines a configuration where all the elevators are operational. The off-peak state defines a configuration where only one of the elevators is operational. The locked state defines a configuration where only one of the elevators is operational, and accessing this elevator requires a key or access card. For example, in the peak and off-peak states, a user calls a elevator by pressing a call button in the conventional manner, whilst in the locked state the user must first swipe a proximity card past a complimentary reader before the call button is operative.

Resource 206 describes an automatic sliding door mechanism 206A. This mechanism includes motion-sensing equipment as a trigger or opening a sliding door, along with a proximity card reader. Resource 206 has three operational states: peak, off-peak and locked. The peak state defines a configuration where the door opens upon the sensing of motion. The off-peak state defines a configuration where the door opens upon the sensing of motion only during a predefined period of time following the validation of an access card by the proximity card reader. The locked state defines a configuration where the door is locked and the motion sensing equipment inactive. When in the inactive state, access via the sliding door requires a physical key and manual intervention.

Subsystem 202 includes a processor 210 coupled to a memory module 211. Memory module 211 carries software instructions 212 that, when executed on a processor such as processor 210, allow subsystem 202 to implement methods according to various embodiments of the present invention, including but not limited to methods such as method 101, method 101A, and variants of these. Processor 201 is also coupled to a communications interface 213, which in the present embodiment included an Ethernet-type networking interface.

Subsystem 202 also includes a database for providing a repository of device-specific scheduling protocols. As foreshadowed above, in other embodiments this database is provided externally of subsystem 202, optionally as a distributed source of information accessible over the Internet.

In the illustrated embodiment, a client terminal 220 is coupled with subsystem 202 over a TCP/IP network 221. In other embodiments the client terminal and subsystem communicate over other channels, including but not limited to the Internet, a WAN, telecommunications network, or serial connection. Client terminal 220 includes a processor 222 coupled to a memory module 223 for carrying software instructions 224, and to a network interface 225. Client terminal 220 is also coupled to a display 226 and peripheral control 227 for facilitating user interaction.

Figure 2A:
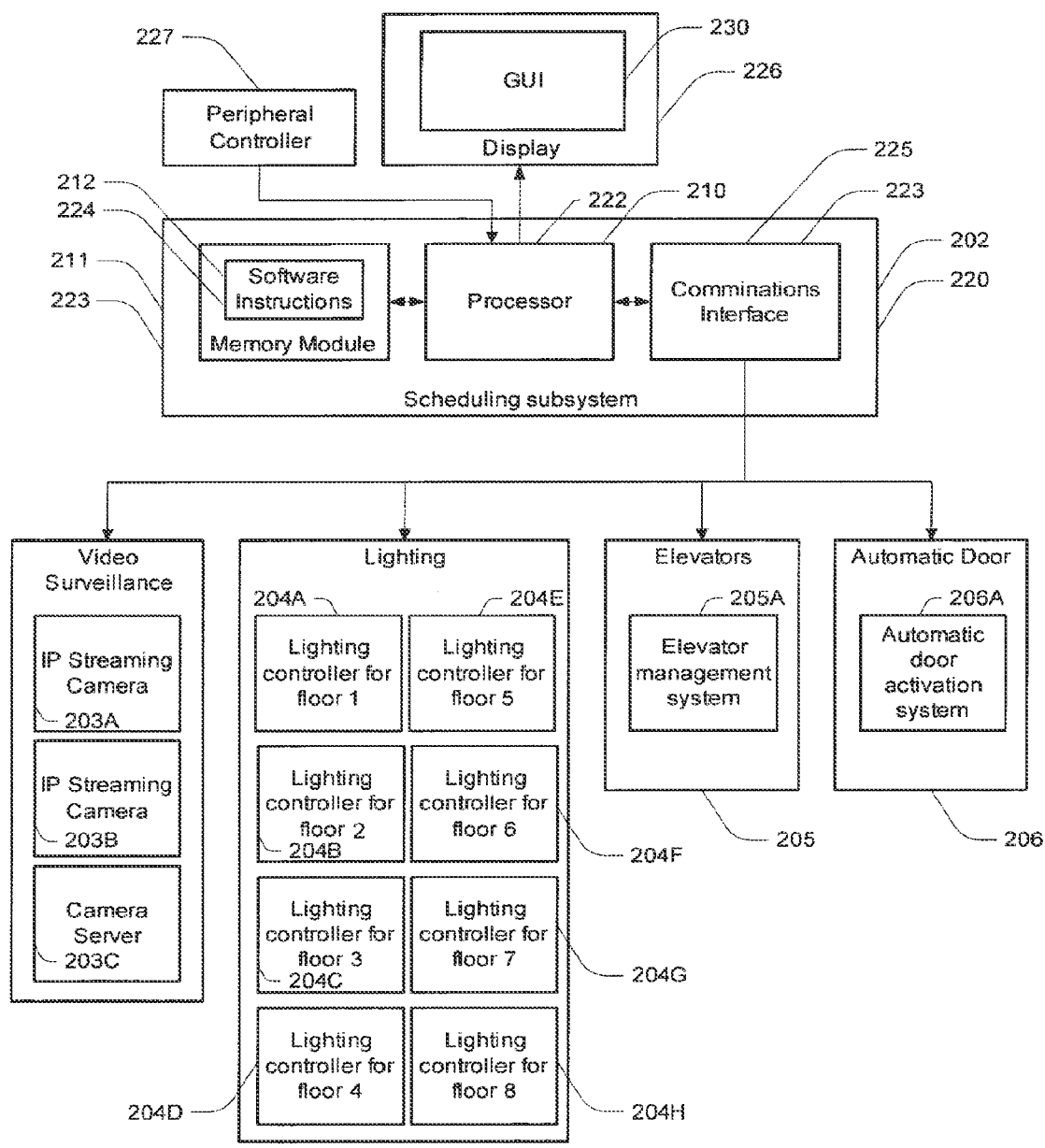
FIG. 2A is a schematic representation of a system according to one embodiment.

In some embodiments, such as that of FIG. 2A, the client terminal is integrated with the scheduling subsystem.

In the embodiment of FIG. 2, user-defined scheduling information is created using client terminal 201 by a human user. Specifically, the human user interacts with a graphical user interface (GUI) 230 provided by terminal 220 and displayed on display 226. This GUI is provided by a software package executing in whole or in part on processor 222 on the basis of software instructions 224. In one embodiment GUI 230 executes as a standalone application on terminal 220. In another embodiment, GUI 230 is provided within a browser application, such as a web browser. In such an embodiment, some or all of the software instructions required for providing GUI 230 are maintained externally of terminal 220, for example in memory module 211.

Figure 3:
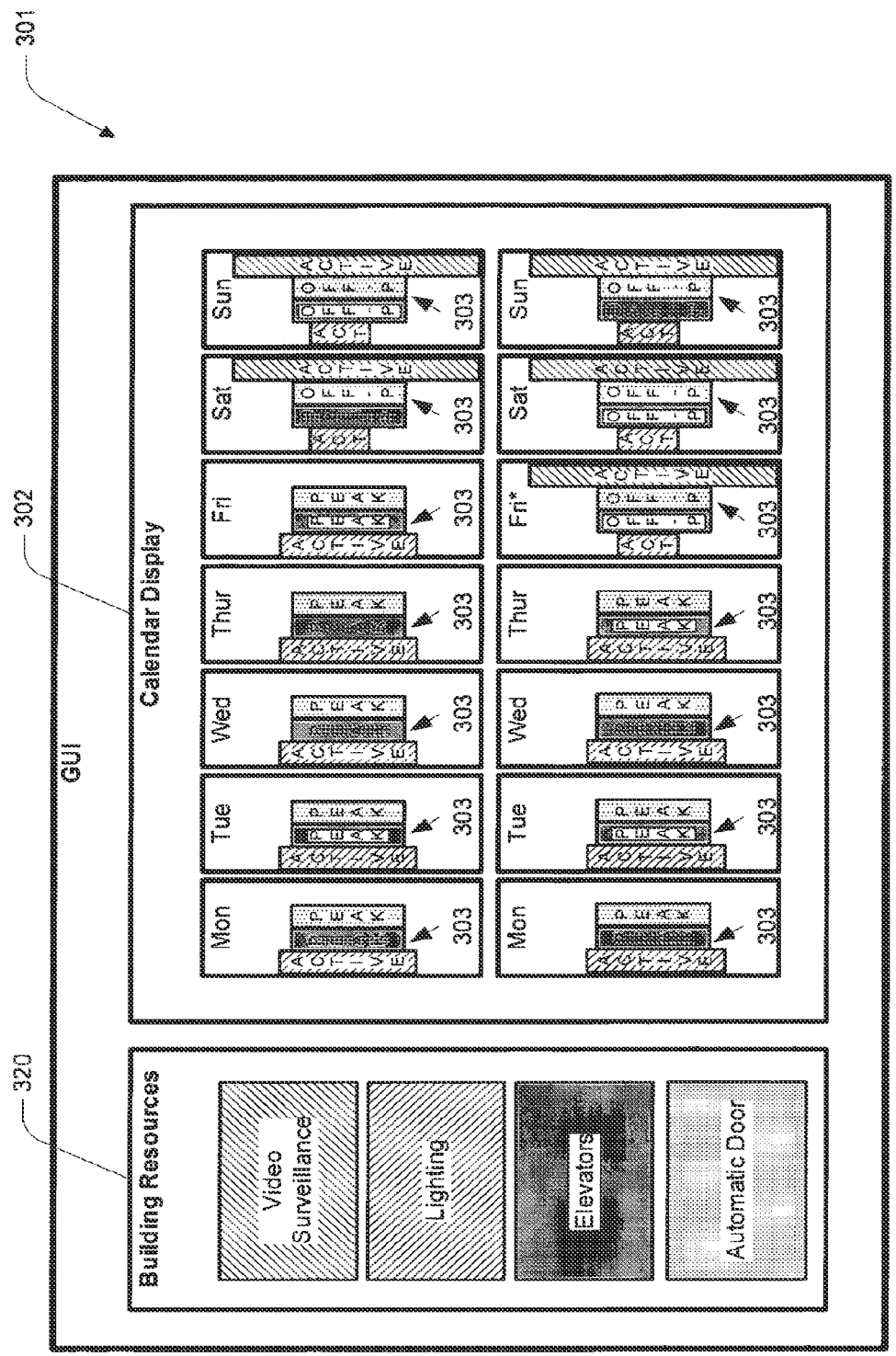
FIG. 3 is a schematic representation of a screenshot from a GUI according to one embodiment.

FIG. 3 illustrates an exemplary screenshot 301 from GUI 230, according to one embodiment. It will be appreciated that this is provided for the sake of example only, and should not be regarded as limiting in any way. That is, the screenshot is provided simply to illustrate various functionalities of a GUI that is used in one embodiment.

Screenshot 301 shows a calendar-type display 302 for containing user-defined time-blocks 303. In the present view, the calendar type display shows calendar weeks as rows, with like days as columns. This is commonly referred to as a "weekly view", and it will be appreciated that monthly views, daily views, and so on are provided in other instances.

The time blocks shown in FIG. 3 are exemplary only, and are not directly related to any other examples considered herein.

Each row includes a field for each day of the week. Each field extends vertically, the upper limit defining a start of the day (such as 12 AM) and lower limit defining an end of the day (such as 11:59 PM). Horizontal markers assist a user in identifying various times of day between these limits.

A user-defined time block, when contained in display 302, defines a period having start time and an end time. In some cases this period stretches over a plurality of days or even weeks. Each time block is also indicative of a resource, such as one of resources 202 to 206, and an operational state for that resource during the period. In the present embodiment, the time block is indicative of two changes in operational state for the relevant resource—a first change at a time identified by the starting limit of the time block, and a second change identified by the end limit of the time block. In some embodiments, resources have default states (such as an inactive state), and the second change is inherently a change to the default state. As such, at times for which there is no corresponding time block for a given resource on display 302, the relevant resource adopts the default state.

In the present embodiment, a user is permitted to manipulate time blocks by techniques including dragging their end limits to different times, and dragging the whole time block to a different location on the display. The latter technique does not affect the length of the period, only the start and end times. A user is also permitted to select a time block and access various options for that time block. In some embodiments these options include, but are not limited to, the following:

Recurrence. A time block may be set to recur on a regular basis, such as daily weekly or monthly. In some embodiments the recurrence is irregular, such as on weekdays, weekends, public holidays, or other predefined special days such as school holidays or during conventions. Where a time block is configured to recur, it is shown multiple times on display 302. In some embodiments, modifying characteristics of one recurring time block optionally results in a corresponding modification to the other related recurring time blocks. For example, in one scenario if a recurring time block has a start time of 5 AM, dragging the upper limit of that time block to 4 AM results in the start time for all related recurrences being moved to 4 AM. In some cases a single one of the recurrences is modifiable as a one-off event, and does not affect other recurrences.

Operations such as cut, copy and paste. These are used much in the same way as in other traditional GUIs.

State information. As noted, each time block is indicative of an operational state. This state is changeable at the discretion of a user.

Prioritization information. In some embodiments, each time block includes a priority rating, which is used to manage situations where two conflicting time blocks overlap. For example, a time bock that recurs only on public holidays should be prioritized over a time block that recurs on a daily basis, or a one-off time block should be prioritized over any recurring time block.

In the present embodiment, a time block is definable using a "drag-and-drop" technique. It will be appreciated that other techniques, including less user-friendly techniques, are used in other embodiments. In the present case, resources are identified in a field 320. A user selects a resource to be scheduled, and drags that resource onto display 302, and subsequently appropriately positions end limits and adjust settings such as recurrence as required.

As mentioned, the present user interface is described as an example only, and should not be regarded as limiting. Similar user interfaces are known in fields other than building resource scheduling, such as diary management. Elements from such interfaces are readily interchanged with those described herein.

By way of GUI 230, scheduling preferences for one or more building resources are conveniently user-definable at a high level of abstraction. Data indicative of the scheduling preferences is periodically derived from time blocks in display 302, and communicated to subsystem 202, where it is received as data indicative of user-defined scheduling information, which is indicative of time-specific operation preferences for one or more building resources. In some embodiments the derivation occurs as changes are made by a user, in other embodiments on a regular basis, and in still other embodiments in response to a user command.

Upon receiving the data indicative of user-defined scheduling information, subsystem 202 progresses with a method such as method 101A so as to apply the operation preferences to the relevant target devices. A hypothetical example is considered below.

For the sake of the present example, assume that, on the basis of time blocks defined in GUI 230, the user-defined scheduling preferences are as follows:

Resource 202 is scheduled to be in the active state on a weekend-only recurring basis from 12:00 AM Saturday to 11:59 AM Sunday. The inactive state is default otherwise.

Resource 203 is scheduled to be in the active state from 7:00 AM to 6:59 PM Monday to Friday on a weekday-only recurring basis, and active from 11:00 AM to 2:59 PM on a weekend-only recurring basis. The inactive state is default otherwise.

Resource 205 is scheduled to be in the peak state from 8:00 AM to 5:59 PM Monday to Friday on a weekday-only recurring basis, in the off-peak state from 6:00 AM to 7:59 AM and 6:00 PM to 11:59 PM on a weekday-only recurring basis and in the off peak state from 9:00 AM to 5:59 PM on a weekend-only recurring basis. The locked state is default otherwise.

Resource 206 is scheduled to be in the peak state from 8:00 AM to 5:59 PM Monday to Friday on a weekday-only recurring basis, in the off-peak state from 6:00 AM to 7:59 AM and 6:00 PM to 11:59 PM on a weekday-only recurring basis and in the off peak state from 9:00 AM to 5:59 PM on a weekend-only recurring basis. The locked state is default otherwise. That is, resource 206 is scheduled in a similar manner to resource 205.

Other preferences are defined for "special" days, such as public holidays. In the example of public holidays, the preferences are denied by way of time blocks having relatively higher priority ratings than the time blocks used for a "normal" day.

Subsystem 202 is responsive to these preferences for identifying the target devices concerned, specifically surveillance cameras 203A and 203B, camera server 203C, light controllers 204A to 204H, elevator management system 205A, and automatic sliding door mechanism 206A.

For the sake of the preset example, assume that the operation rules apply:

Camera server 203C should be activated fifteen minutes prior to any surveillance cameras, so that it has time to boot up and launch various software applications.

The activation of any two or more of light controllers 204A to 204H should be staggered at five-minute intervals.

Elevator management system 205A takes five minutes to progress from the locked state to either the peak or off-peak state.

Therefore, the following operation settings are defined:

Camera 203A: adopt active state at 12:00 AM Saturday, adopt inactive state at 11:59 PM Sunday.

Camera 203B: adopt active state at 12:00 AM Saturday, adopt inactive state at 11:59 PM Sunday.

Camera server 203C: adopt active state at 11:45 PM Friday, adopt inactive state at 11:59 PM Sunday.

Light controller 204A: adopt active state at 6:30 AM each weekday, adopt inactive state at 6:59 PM each weekday, adopt active state at 10:30 AM each weekend day, adopt locked state at 2:59 AM each weekend day.

Light controller 204B: adopt active state at 6:35 AM each weekday, adopt inactive state at 6:59 PM each weekday, adopt active state at 10:35 AM each weekend day, adopt locked state at 2:59 AM each weekend day.

Light controller 204C: adopt active state at 6:40 AM each weekday, adopt inactive state at 6:59 PM each weekday, adopt active state at 10:40 AM each weekend day, adopt locked state at 2:59 AM each weekend day.

Light controller 204D: adopt active state at 6:45 AM each weekday, adopt inactive state at 6:59 PM each weekday, adopt active state at 10:45 AM each weekend day, adopt locked state at 2:59 AM each weekend day.

Light controller 204E: adopt active state at 6:50 AM each weekday, adopt inactive state at 6:59 PM each weekday, adopt active state at 10:50 AM each weekend day, adopt locked state at 2:59 AM each weekend day.

Light controller 204H: adopt active state at 6:55 AM each weekday, adopt inactive state at 6:59 PM each weekday, adopt active state at 10:55 AM each weekend day, adopt locked state at 2:59 AM each weekend day.

Light controller 204G: adopt active state at 7:00 AM each weekday, adopt inactive state at 6:59 PM each weekday, adopt active state at 11:00 AM each weekend day, adopt locked state at 2:59 AM each weekend day.

Elevator management system 205A: adopt off-peak state at 5:45 AM each weekday; adopt peak state 8:00 AM each weekday, adopt off-peak state at 5:59 PM each weekday, adopt locked state at 11:59 PM each weekday, adopt off-peak state at 9:00 AM each weekend day, adopt locked state at 5:59 AM each weekend day.

Automatic sliding door mechanism 206A: adopt off-peak state at 5:45 AM each weekday; adopt peak state 8:00 AM each weekday, adopt off-peak state at 5:59 PM each weekday, adopt locked state at 11:59 PM each weekday, adopt off-peak state at 9:00 AM each weekend day, adopt locked state at 5:59 AM each weekend day.

Subsystem 202 obtains device-specific scheduling protocols for each of these devices. In the context of schedule storage protocols, assume for the sake of example that these scheduling protocols are indicative of the following:

Surveillance cameras 203A and 203B use the same device-specific scheduling protocols. These devices are able to store scheduling information relating to a single 24-hour period only.

Camera server 203C is unable to store scheduling information, and is only able accept commends to activate or deactivate at the time those commands are to be implemented.

Light controllers 204A to 204H are able to store scheduling information for a seven-day week.

Elevator management system 205A is able to store scheduling information for a seven-day week.

Automatic sliding door mechanism 206A is able to store scheduling information relating to a single 24-hour period only.

Subsystem 202 includes (or is coupled to) a database (or other information repository) that maintains data indicative of loaded scheduling information for each of the target devices. This data is periodically analyzed on a minute-by-minute basis to identify inconsistencies between the operation settings and the loaded scheduling information. This analysis looks for the following inconsistencies:

For surveillance cameras 203A and 203B: inconsistencies in the 24-hour period following the analysis.

For camera server 203C: inconsistencies in the present state.

For light controllers 204A to 204H: inconsistencies in the 168-hour period following the analysis.

For elevator management system 205A: inconsistencies in the 168-hour period following the analysis.

For automatic sliding door mechanism 206A: inconsistencies in the 24-hour period following the analysis.

Where, for a given device, one or more inconsistencies are found between the operation settings and the loaded scheduling information, consistent scheduling information is provided to that device in accordance with the scheduling protocol for that device. By this approach, the target devices are at worst inconsistent for a one-minute period. In some embodiments analysis is carried out more regularly to further reduce this error window.

Figure 2B:
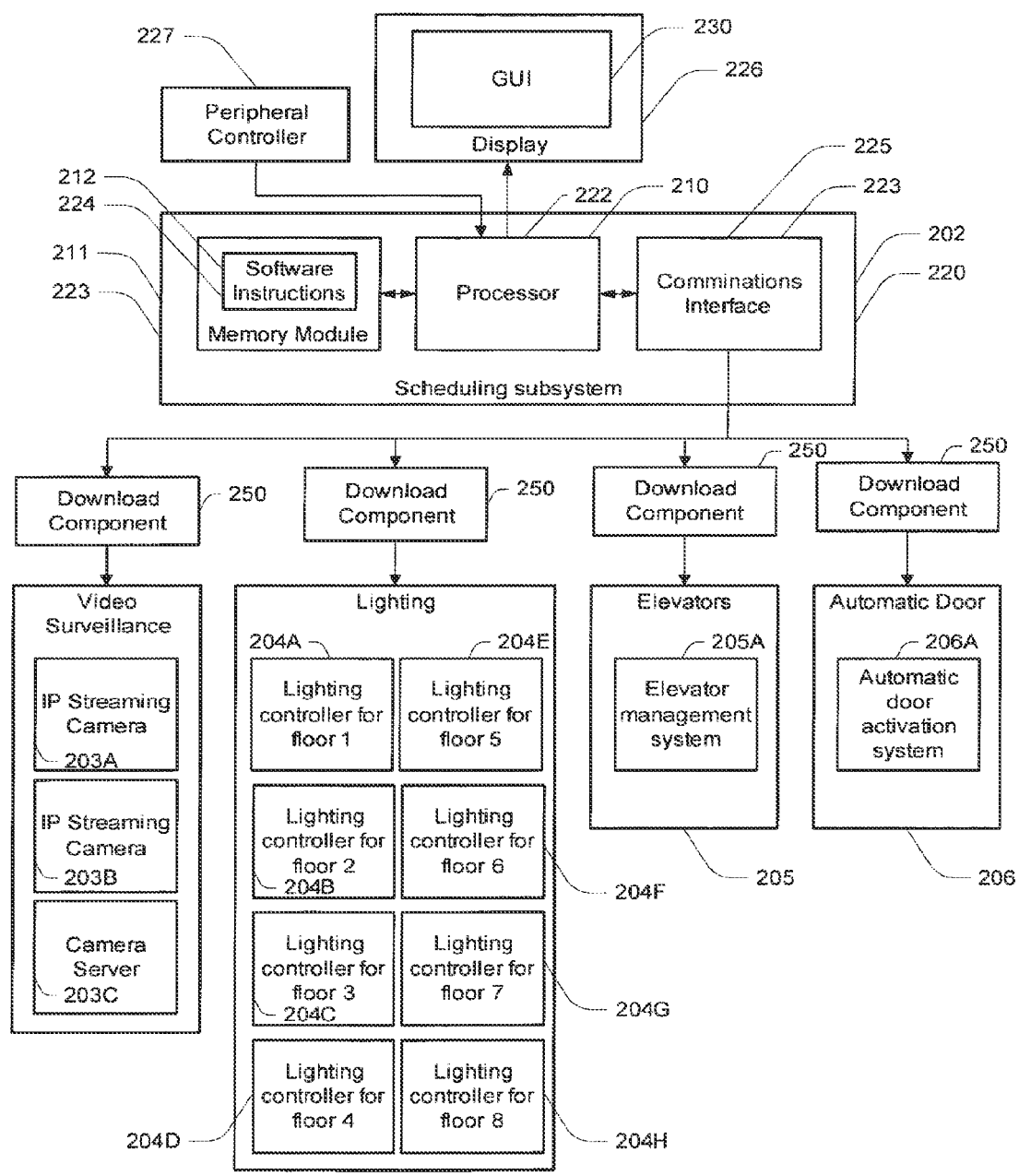
FIG. 2B is a schematic representation of a system according to one embodiment.

In the present embodiment, consistent scheduling information is provided to each device by way of a respective download component (such as a component 250 of FIG. 2B), which performs any necessary signal translation on the basis of the relevant device-specific translation protocol. In some embodiments, such as that of FIG. 2, the download components are provided by the processor and communications interface of subsystem 202. In other embodiments, external download components 260 are used.

It will be appreciated that the present disclosure provides for improved systems and methods for scheduling business resources. In particular, there are advantages stemming from the ability to simultaneously schedule a plurality of different devices, and stemming from the ability to take into consideration irregular events without necessarily having to manually alter scheduling information at multiple locations.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer implemented method configured to enable user control over scheduling of physical target devices via a graphical user interface, the method including:
   providing a graphical user interface that is configured to:
   (i) enable a user to select one or more building resources from an available set of predefined building resources, wherein each set of predefined building resources is representative of a set of discrete physical hardware devices at distributed locations in a building, wherein each target device is capable of adopting at least an activated operational state and a deactivated operational state;
   (ii) for the selected one or more building resources, enabling the user to define an operational schedule, wherein defining the operational schedule includes accepting user input representative of times during a specified period for which each of the selected one or more building resources is to be activated, wherein the user interface is configured to enable a user to define, for a given building resource:
   an operational schedule for a first day; and
   a recurrence parameter, wherein the recurrence parameter is representative of a category of day types, wherein defining of the recurrence parameter causes automated defining of operational schedules for a plurality of further days of the defined day type;
   in response to information inputted by the user via the graphical user interface defining an operational schedule, executing an automated process including the following steps:
   (i) for each of the selected one or more building resources, identifying the hardware devices of which the building resource is representative;
   (ii) for each identified hardware device, accessing a repository of scheduling protocols thereby to determine, for each hardware device:
   (a) data representative of a communications protocol defining a data format and communications channel associated with the hardware device, wherein the data representative of the communications protocol and communications channel is configured to enable a scheduling module to transmit scheduling instructions to the hardware device; and
   (b) data representative of a schedule storage protocol, wherein the schedule storage protocol defines a manner in which scheduling information is able to be stored locally by the target device;
   (iii) for each identified hardware device, operating the scheduling module providing one or more signals in accordance with the communications protocol for that hardware device based on the data representative of a schedule storage protocol, such that the hardware device is programmed to adopt its activated operational state whenever a user-defined operational schedule for the building resource of which that hardware device a part defines that the more building resources is to be activated; wherein providing the one or more signals includes periodically reprogramming internal scheduling memory storage for a given hardware device in the case that the schedule storage protocol defining a manner in which scheduling information is able to be stored locally by the target device defines an ability to store scheduling information for a maximum time period that is less than a total time period spanned by the defined operational schedule.

2. A method according to claim 1 wherein the recurrence parameter is selected from a set of recurrence parameters including: daily, weekly, monthly, weekdays, and weekends.

3. A method according to claim 1 wherein the user defines a given operational schedule for a specific set of one or more building resources spanning a time period from Time A to Time B,
wherein the one or more building resources are representative of hardware devices including:
(i) at least one first-category hardware device, wherein the or each first category hardware device is configured to maintain, in a memory module provided by that hardware device, scheduling data defining operation settings spanning a time period of greater than or equal to from a Time A to a Time B, wherein the period of time from Time A to Time B is greater than 24 hours, wherein being configured to maintain data defining operation settings spanning a time period of greater than or equal to from a Time A to a Time B includes maintaining data defining an operational change at Time A and data defining an operational chance at a Time B or a time following Time B;
(ii) at least one second-category hardware device, wherein the or each second category hardware device is configured to maintain, in a memory module provided by that hardware device, scheduling data for a period of 24 hours only, such any given second-category device is not able to be programmed with scheduling data defining operation settings spanning a time period of greater than or equal to from a Time A to a Time B, wherein being configured to maintain data defining operation settings spanning a time period of 24 hours includes maintaining data defining an operational change at Time A and data defining an operational change at a Time C, wherein time C is a time up to 24 hours of Time A;
(iii) at least one third-category hardware device, wherein the or each third category hardware device is unable to maintain scheduling data in a local memory module, such that any given second-category device is not able to be programmed with scheduling data defining any future changes in operational settings;
wherein providing the one or more signals includes:
(i) for each first category hardware device programming the hardware device's local memory with scheduling data for Time A to Time B, scheduling data defining an operational change at time A and Time B;
(ii) for each second category hardware device, initially programming the hardware device's local memory with scheduling data for Time A to Time C, wherein Time C is 24 hours following time A, including an operational change at Time A, and subsequently within 24 hours of Time B programming the hardware device's local memory with scheduling data for a time period including Time B, including an operational change at Time B; and
(iii) for each third hardware device, initially programming the hardware device with an operational state for Time A, and providing subsequent commands to the hardware device thereby to effect scheduled changes in operational state on an as required-basis between Time A and Time B including an operational change at time B.

4. A method according to claim 1 wherein the user defines a given operational schedule for a specific set of one or more building resources, wherein the one or more building resources include an HVAC-support resource, a light-support resource, and an access control-support resource.

5. A method according to claim 1 wherein providing the one or more signals includes applying a set of time-specific operation rules, wherein the time specific operation rules include:
a requirement that a first hardware device adopt an activated operational state whenever a second hardware device adopts an activated operational state.

6. A method according to claim 1 wherein providing the one or more signals includes applying a set of time-specific operation rules, wherein the time specific operation rules include:
a requirement that a first hardware device adopt an activated operational state a defined time period prior to a second hardware device adopting an activated operational state, such that for a given operational schedule for a given building resources two or more hardware devices are transitioned into their respective operational states in a staggered manner.

7. A method according to claim 6 wherein for a given operational schedule for a given building resources two or more hardware devices are transitioned into their respective operational states in a staggered manner, with a first of the hardware devices transitioning into its operational state at a point in time preceding the defined specified period for which its building resources is to be activated thereby to enable functional activation of the building resource at the commencement of the defined specified period for which its building resources is to be activated.

8. A computer system configured to perform a configured to enable user control over scheduling of physical target devices via a graphical user interface, the method including:
providing a graphical user interface that is configured to:
(i) enable a user to select one or more building resources from an available set of predefined building resources, wherein each set of predefined building resources is representative of a set of discrete physical hardware devices at distributed locations in a building, wherein each target device is capable of adopting at least an activated operational state and a deactivated operational state;
(ii) for the selected one or more building resources, enabling the user to define an operational schedule, wherein defining the operational schedule includes accepting user input representative of times during a specified period for which each of the selected one or more building resources is to be activated, wherein the user interface is configured to enable a user to define, for a given building resource:
an operational schedule for a first day; and
a recurrence parameter, wherein the recurrence parameter is representative of a category of day types, wherein defining of the recurrence parameter causes automated defining of operational schedules for a plurality of further days of the defined day type;
in response to information inputted by the user via the graphical user interface defining an operational schedule, executing an automated process including the following steps:
(i) for each of the selected one or more building resources, identifying the hardware devices of which the building resource is representative;

(ii) for each identified hardware device, accessing a repository of scheduling protocols thereby to determine, for each hardware device:
  (a) data representative of a communications protocol defining a data format and communications channel associated with the hardware device, wherein the data representative of the communications protocol and communications channel is configured to enable a scheduling module to transmit scheduling instructions to the hardware device; and
  (b) data representative of a schedule storage protocol, wherein the schedule storage protocol defines a manner in which scheduling information is able to be stored locally by the target device;
(iii) for each identified hardware device, operating the scheduling module providing one or more signals in accordance with the communications protocol for that hardware device based on the data representative of a schedule storage protocol, such that the hardware device is programmed to adopt its activated operational state whenever a user-defined operational schedule for the building resource of which that hardware device a part defines that the more building resources is to be activated; wherein providing the one or more signals includes periodically reprogramming internal scheduling memory storage for a given hardware device in the case that the schedule storage protocol defining a manner in which scheduling information is able to be stored locally by the target device defines an ability to store scheduling information for a maximum time period that is less than a total time period spanned by the defined operational schedule.

9. A system according to claim 8 wherein the recurrence parameter is selected from a set of recurrence parameters including: daily, weekly, monthly, weekdays, and weekends.

10. A system according to claim 8 wherein the user defines a given operational schedule for a specific set of one or more building resources spanning a time period from Time A to Time B,
wherein the one or more building resources are representative of hardware devices including:
  (i) at least one first-category hardware device, wherein the or each first category hardware device is configured to maintain, in a memory module provided by that hardware device, scheduling data defining operation settings spanning a time period of greater than or equal to from a Time A to a Time B, wherein the period of time from Time A to Time B is greater than 24 hours, wherein being configured to maintain data defining operation settings spanning a time period of greater than or equal to from a Time A to a Time B includes maintaining data defining an operational change at Time A and data defining an operational chance at a Time B or a time following Time B;
  (ii) at least one second-category hardware device, wherein the or each second category hardware device is configured to maintain, in a memory module provided by that hardware device, scheduling data for a period of 24 hours only, such any given second-category device is not able to be programmed with scheduling data defining operation settings spanning a time period of greater than or equal to from a Time A to a Time B, wherein being configured to maintain data defining operation settings spanning a time period of 24 hours includes maintaining data defining an operational change at Time A and data defining an operational change at a Time C, wherein time C is a time up to 24 hours of Time A;
  (iii) at least one third-category hardware device, wherein the or each third category hardware device is unable to maintain scheduling data in a local memory module, such that any given second-category device is not able to be programmed with scheduling data defining any future changes in operational settings;
wherein providing the one or more signals includes:
  (i) for each first category hardware device programming the hardware device's local memory with scheduling data for Time A to Time B, scheduling data defining an operational change at time A and Time B;
  (ii) for each second category hardware device, initially programming the hardware device's local memory with scheduling data for Time A to Time C, wherein Time C is 24 hours following time A, including an operational change at Time A, and subsequently within 24 hours of Time B programming the hardware device's local memory with scheduling data for a time period including Time B, including an operational change at Time B; and
  (iii) for each third hardware device, initially programming the hardware device with an operational state for Time A, and providing subsequent commands to the hardware device thereby to effect scheduled changes in operational state on an as required-basis between Time A and Time B including an operational change at time B.

11. A system according to claim 8 wherein the user defines a given operational schedule for a specific set of one or more building resources, wherein the one or more building resources include an HVAC-support resource, a light-support resource, and an access control-support resource.

12. A system according to claim 8 wherein providing the one or more signals includes applying a set of time-specific operation rules, wherein the time specific operation rules include:
a requirement that a first hardware device adopt an activated operational state whenever a second hardware device adopts an activated operational state.

13. A system according to claim 8 wherein providing the one or more signals includes applying a set of time-specific operation rules, wherein the time specific operation rules include:
a requirement that a first hardware device adopt an activated operational state a defined time period prior to a second hardware device adopting an activated operational state, such that for a given operational schedule for a given building resources two or more hardware devices are transitioned into their respective operational states in a staggered manner.

14. A system according to claim 13 wherein for a given operational schedule for a given building resources two or more hardware devices are transitioned into their respective operational states in a staggered manner, with a first of the hardware devices transitioning into its operational state at a point in time preceding the defined specified period for which its building resources is to be activated thereby to enable functional activation of the building resource at the commencement of the defined specified period for which its building resources is to be activated.

\* \* \* \* \*